D. A. STOWELL, A. C. SMITH & E. H. COSGROVE.
TIME RECORDER.
APPLICATION FILED OCT. 25, 1913.

1,200,265.

Patented Oct. 3, 1916.
5 SHEETS—SHEET 1.

Witnesses.

Inventors.
Desrie A. Stowell
Albert C. Smith
Edwin H. Cosgrove
by Southgate & Southgate
Atty's D. A. STOWELL, A. C. SMITH & E. H. COSGROVE.
TIME RECORDER.
APPLICATION FILED OCT. 25, 1913.

1,200,265.

Patented Oct. 3, 1916.
5 SHEETS—SHEET 2.

Fig.3.

Witnesses.
M. C. Healy
C. F. Wesson

Inventors.
Desrie A. Stowell
Albert C. Smith
Edwin H. Cosgrove
by Southgate + Southgate Atty's.

D. A. STOWELL, A. C. SMITH & E. H. COSGROVE.
TIME RECORDER.
APPLICATION FILED OCT. 25, 1913.

1,200,265.

Patented Oct. 3, 1916.
5 SHEETS—SHEET 3.

Witnesses.
M. C. Healy.
C. F. Wesson.

Inventors.
Desrie A. Stowell
Albert C. Smith
Edwin H. Cosgrove
by Southgate & Southgate
Atty's.

D. A. STOWELL, A. C. SMITH & E. H. COSGROVE.
TIME RECORDER.
APPLICATION FILED OCT. 25, 1913.

1,200,265.

Patented Oct. 3, 1916.
5 SHEETS—SHEET 4.

Witnesses.
M. C. Healy.
C. F. Nisson

Inventors.
Desrie A. Stowell
Albert C. Smith
Edwin H. Cosgrove
by Southgate + Southgate
Attys.

UNITED STATES PATENT OFFICE.

DESRIE A. STOWELL, OF GARDNER, AND ALBERT C. SMITH, OF PITTSFIELD, MASSACHUSETTS, AND EDWIN H. COSGROVE, OF NEW HAVEN, CONNECTICUT, ASSIGNORS TO SIMPLEX TIME RECORDER CO., OF GARDNER, MASSACHUSETTS, A CORPORATION OF MASSACHUSETTS.

TIME-RECORDER.

1,200,265. Specification of Letters Patent. Patented Oct. 3, 1916.

Application filed October 25, 1913. Serial No. 797,315.

*To all whom it may concern:*

Be it known that we, DESRIE A. STOWELL, ALBERT C. SMITH, and EDWIN H. COSGROVE, citizens of the United States, said STOWELL residing at Gardner, county of Worcester, State of Massachusetts, said SMITH residing at Pittsfield, county of Berkshire, State of Massachusetts, and said COSGROVE residing at New Haven, county of New Haven, State of Connecticut, have invented a new and useful Time-Recorder, of which the following is a specification.

This invention relates to apparatus for recording on a suitable card or other check the time when a workman enters or leaves his place of employment, or the time of beginning and ending a certain piece of work. Each employee has his individual card, which is used for any convenient period from one week to two or more weeks, the records upon the cards determining the compensation due to the workman for the given period.

In the present embodiment of our invention the records are made to denote the actual time at which the record was made, by printing the day of the month, the hour and the minute, so that at the end of the given period the elapsed working time may be calculated from the card.

The present apparatus is of the type wherein the workman places his card in the machine at a point designated by an indicator, and presses a lever, thereby actuating the printing mechanism and recording the time upon the card.

In machines of this character, type wheels are provided for printing the minute, hour and day when the registration is effected. The minute wheel is usually continuously rotated by the clock mechanism and the hour wheels are periodically rotated step by step from mechanism controlled by the minute wheel. The day wheel is likewise periodically rotated by suitable mechanism usually controlled by the hour wheel.

Inasmuch as the minute wheel is constantly rotating, there is only an instant during each minute in which the character upon the face of said wheel is in accurate printing position, and it is therefore necessary to provide positioning mechanism for the minute wheel. This has been accomplished in various ways, but it sometimes occurs that the relative positions of the parts of the positioning mechanism are such as to render the same inoperative.

One of the objects of the present invention is to provide auxiliary adjusting means which will operate immediately upon the initial depression of the operating lever to preliminarily adjust the minute wheel so that it will be in proper position for engagement by the positioning mechanism as said lever is further depressed to actuate the printing mechanism.

It is also found in practice that when the minute printing wheel is rotated to printing position near the time when the hour change is to take place there is a likelihood of erroneous registration, by reason of the fact that the minute wheel may be advanced by the positioning mechanism to 00 position before the hour wheel is advanced.

Another object of this invention is to provide a yielding connection between the shaft which operates the day and hour wheels and the shaft which carries the minute wheels, so that the minute wheel may be at any time adjusted to correct printing position, by the depression of the operating lever, and to further provide means for so coördinating the rotation of said shafts as to insure proper recordation, even if the lever is operated an instant before an hour change is to take place.

Another object of the invention is to provide quick acting and positive locking means for the detents which normally position the hour and day printing wheels and prevent them from rotation, thus avoiding any possibility of overthrow or other displacement of the hour and day wheels which would cause an erroneous record to be made.

The mechanism for advancing and positively locking the hour and day printing wheels technically known as "transfer mechanism" is not claimed herein as it constitutes the subject matter of a divisional application.

Further objects of this invention are fully described in the following specification, and are more particularly pointed out in the appended claims.

A preferred form of our invention is shown in the drawings, in which—

Figures 1, 2, 9:
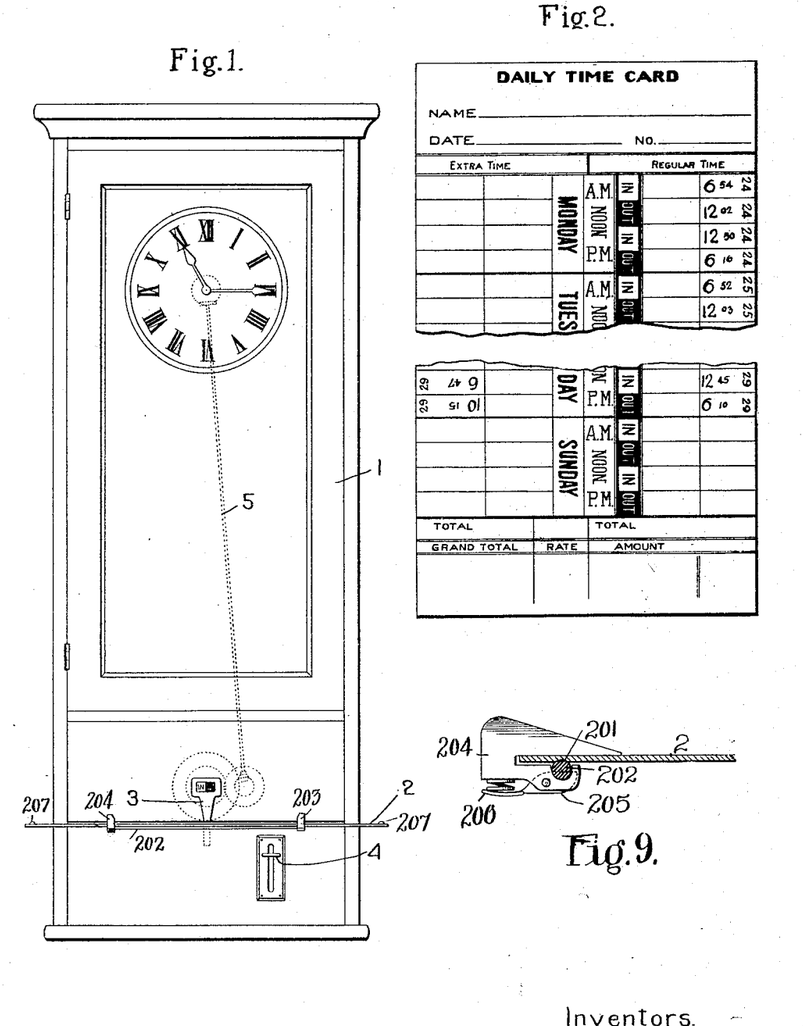
Figure 1 is a front elevation of a clock provided with the recording apparatus embodying this invention.
Fig. 2 is a face view of one of the cards or checks to be used in connection with this invention.
Fig. 9 is a side elevation of one of the card positioning abutments.

The present apparatus is so constructed and arranged that time records for each day will be arranged in vertical columns, and the card is divided into sections beginning with Monday at the top and ending with Sunday at the bottom, as illustrated in Fig. 2. Each section is divided into four divisions for indicating respectively the time when the workman enters by "in", and the time of his exit by "out". The regular time is indicated upon one side of the card and extra time upon the other. For convenience in placing the card in the machine, especially in faint light, the word "in" is printed upon a light field and the word "out" upon a dark field.

Figure 4:
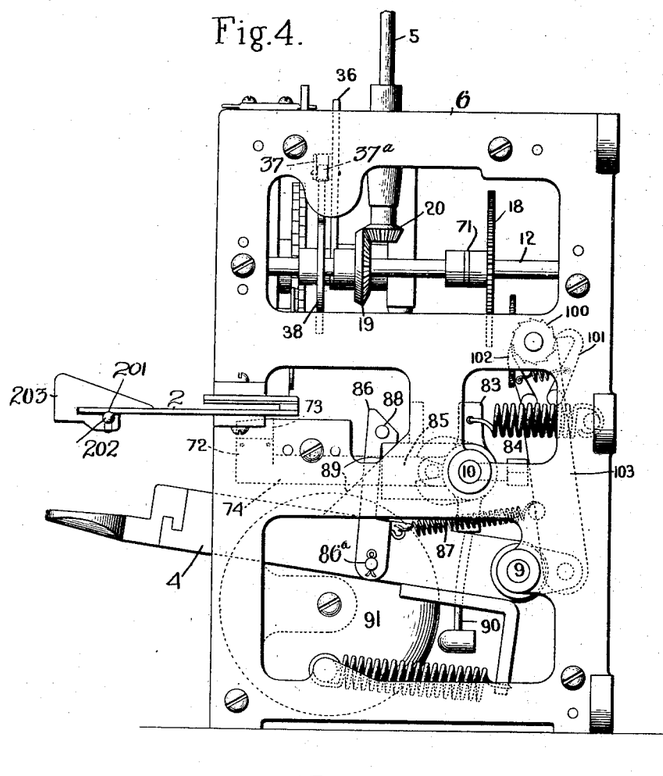
Fig. 4 is an end elevation of the same.

A casing 1, (Fig. 1) contains the operative part of the mechanism, and is provided with a clock or time movement having an exposed dial and hands as usual, the lower portion of the casing serving to house the recording mechanism. Projecting from the front of the casing is a shelf 2 which is adapted to support the time card during the recording operation, and the position of the card upon said shelf is determined by an indicator 3 which is provided with a panel upon which the word " in " appears on a white field and the word "out" upon a black field corresponding to similar designations upon the time card. The shelf 2 is provided with a shallow groove 201 (Fig. 9) upon its under side, along which slides a round rod 202 connecting in spaced relation a pair of sliding abutments 203 and 204. The right hand abutment 203 is rigidly secured to the rod 202 (Fig. 4) and the left hand abutment 204 is provided with a pivoted spring-pressed latch 205 which engages the bottom of a transverse slot in the rod 202 and presses the rod yieldingly upward into the grove 201. The pressure of the spring is sufficient to prevent accidental displacement of the abutments, which are spaced apart a distance corresponding to the length of the record card and serve to quickly locate the cards when a considerable number of people desire to record in the same space on each card, as at "morning in" or "noon out". The latch 205 has a finger piece 206 by which the friction is easily released when the abutments are to be moved to new positions. Stops 207 limit the endwise movements of the abutments upon the shelf 2.

Beneath the shelf 2 is the end of an operating lever 4 which is adapted to be depressed by the workman for the purpose of operating the printing mechanism. The connection between the arbor of the minute hand of the clock and the recording mechanism in the lower portion of the case is indicated in dotted lines and comprises a flexible shaft 5 and suitable gears meshing respectively with a pinion upon the arbor of the minute wheel and a gear upon the driving shaft of the recording mechanism.

The recording apparatus may be generally described as comprising a skeleton rectangular frame having suitable end plates 6, side plates 7 and a top plate 8. Journaled in the end plates is a main rock shaft 9 to which a hand operating lever 4 is connected, a rock shaft 10 carrying a printing hammer, and a shaft 11 carrying operating mechanism adapted to feed an inked ribbon between the printing hammer and the set of type wheels.

The driving shaft 12 and main shaft 13 are journaled in the side plates 7 and above the rock shafts heretofore described. The latter has time printing wheels near its forward end and also carries suitable mechanism for rotating and positioning the same. The printing hammer is operably mounted immediately beneath the printing wheel.

In operation the workman properly locates his card by the indicator 3 and depresses the hand lever, whereupon the printing hammer strikes the under face of the card and forces the same against the type ribbon and the characters upon the printing wheel causing an impression of the minute, hour and day to be made upon the card.

Figure 5:
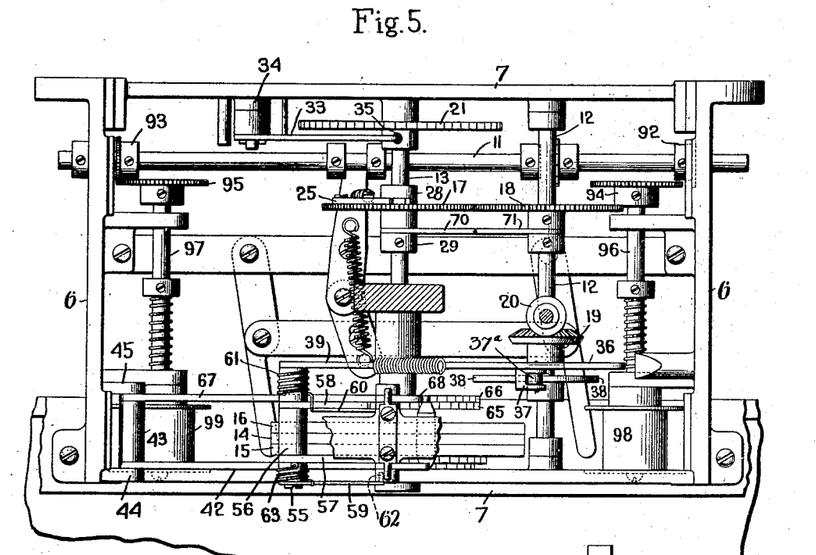
Fig. 5 is a top plan view, the superior part of the casing having been removed to exhibit the mechanism more perfectly.
Figure 7:
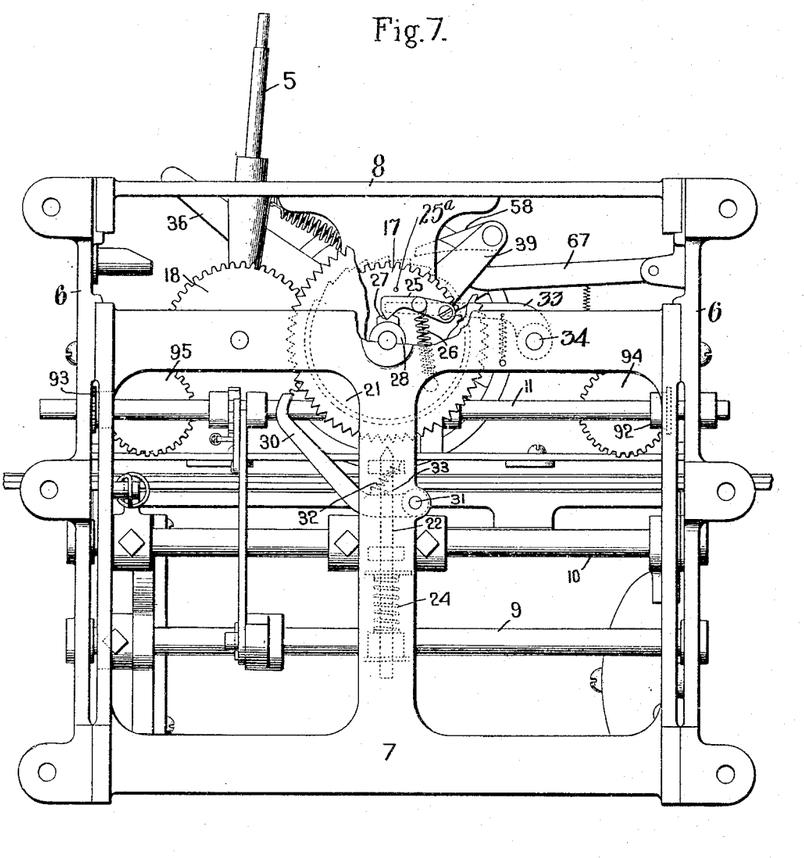
Fig. 7 is a rear elevation partly broken away to exhibit the yielding connections upon the main shaft which permit the proper adjustment of the minute wheel.

The time printing wheels comprise a minute wheel 14 rigidly secured to the main shaft 13 and an hour wheel 15 and day wheel 16 each rotatably mounted upon the main shaft 13 upon opposite sides of the minute wheel 14. The minute wheel is actuated through a gear 17 (Figs. 5 and 7) on the main shaft 13 which meshes with a gear 18 upon the driving shaft 12, the latter being actuated through beveled gears 19 and 20 (Fig. 4), the gear 20 being secured upon the lower end of the flexible shaft 5 which is geared to the arbor of the minute wheel of the clock. The gear 17 is yieldingly connected to the shaft 13 as will be hereinafter described.

Figure 6:
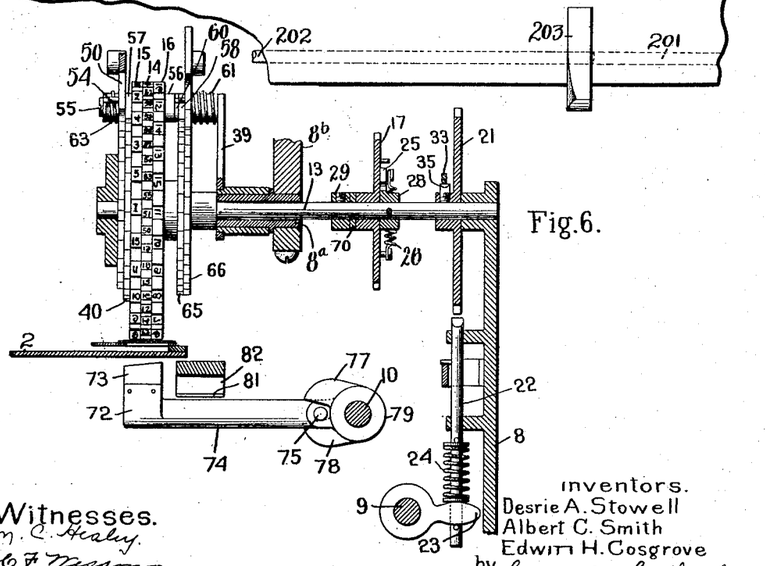
Fig. 6 is a vertical sectional view through the bearings of the main shaft and of the locking bolt which positions and temporarily locks the minute wheel.

*Mechanism for positioning minute printing wheel.*—In this class of time recorders it frequently happens that the minute wheel 14, which rotates continuously, will indicate a time between two minutes, so that unless prevented, a record imprint would be made upon the card which would not record either minute definitely. To obviate this defect means has previously been provided whereby upon the depression of the operating lever the minute wheel will be rotated either forwardly or backwardly to a proper printing position. This mechanism as herein shown comprises a positioning wheel 21 (see Figs. 5, 6 and 7) which is rigidly affixed to the main shaft, the positioning wheel being provided with a series of 60 V-shaped teeth with corresponding recesses between the same. A locking plunger or bolt 22 journaled in lugs in the rear of the frame is adapted to be forced into coöperative relation with the teeth upon the positioning wheel by an arm 23 rigidly secured to the manually operated main rock shaft 9. A cushioning spring 24 is provided between the bolt 22 and its actuating arm 23 to avoid shock or breakage of the parts. The upper end of the locking bolt is beveled to conform accurately to the recesses in the positioning wheel whereby the bolt upon being forced into one of said recesses will cause the positioning wheel to rotate forwardly or backwardly, as the case may be, until the end of the bolt is fully seated in the recess, at which time a character upon the minute wheel will be in proper position for printing. The locking bolt 22 is adapted to enter the space between two teeth upon the positioning wheel just previous to a registration, and to remain there until the recording is completed, thus locking the minute wheels against rotation until the printing is effected.

As the main shaft 13, upon which the minute type wheel 14 and the positioning wheel 21 are rigidly secured is continuously revolving, thus causing the teeth in the wheel to pass the locking bolt continually, there will only be an instant in each minute when the plunger will be positioned exactly between two adjoining teeth. A yielding connection is therefore established between the driving shaft 12 and the main shaft 13 to permit the minute wheel to be slightly rotated to proper printing position. This yielding connection is accomplished by mounting the gear 17 loosely upon the main shaft 13 and providing the same with a dog 25 having a V-shaped end normally held by a spring 26 (see Fig. 7) in engagement with a V-shaped notch 27 in a lug upon a hub 28, which hub is rigidly secured to the main shaft 13. The hub 28 also serves to secure the gear 18 from lateral movement upon one side, and a corresponding hub 29 is provided upon the other side of the gear for preventing the same from moving upon the shaft in the opposite direction. By reason of this yielding connection the minute wheel may be positioned by moving the locking bolt into full engagement with the teeth on the positioning wheel, thus rotating the shaft of the minute printing wheel and, if necessary causing the end of the dog 25 to ride up on one side or the other of the V-shaped notch 27 during the printing operation. A stop or pin 25ª is secured in the gear 17 slightly above the dog 25 and prevents the end of the dog from rising above the sides of the notch 27 and thus escaping therefrom. Upon releasing the locking bolt the spring 26 will immediately cause the main shaft and its gear to return to its normal driving position.

To avoid the possibility of the end of the locking bolt coming in contact with an end or point of a tooth of the positioning wheel 21, an auxiliary finger 30 is provided (see Fig. 7) which is pivoted to the rear frame upon a stud 31 and is pressed toward the positioning wheel by a spring 32 but is normally prevented from engaging the positioning wheel by a stud 32ª upon the locking bolt which extends over the upper edge of the finger. Upon the depression of the operating lever to raise the locking bolt the auxiliary finger 30 may be retracted by the spring 32 and engages the side of one of the teeth of the positioning wheel and preliminarily adjusts the same so that the end of the plunger will enter properly between two teeth of the positioning wheel. Thus, if the positioning wheel should be in such a position that the end of the plunger would be likely to come in contact with the end of a tooth the slight shifting caused by the auxiliary finger will obviate the difficulty.

To obviate the possibility of any rocking movement of the positioning wheel by reason of too rapid movement of the hand lever causing the figure 59 on the minute wheel to again come into printing position after the hour wheel has been advanced, the positioning wheel is locked against backward movement at the time of the hour change by a dog 33 (Figs. 5, 6 and 7) pivoted upon a stud 34 on the rear frame and dropping behind a pin 35 on the hub of the positioning wheel, at the instant when the characters 00 come into printing position.

*Hour printing wheel mechanism.*—In order to properly position the hour and day printing wheels, pawl mechanism is provided which is adapted to advance the hour printing wheel one step upon every revolution of the minute printing wheel and to advance the day printing wheel one step upon each revolution of the hour printing wheel, it being understood that the minute printing wheel is provided with sixty characters, from 00 to 59, the hour printing wheel with twenty-four characters from 1 to 12, and repeated, and the day printing wheel with thirty-one characters 1 to 31.

Figure 3:
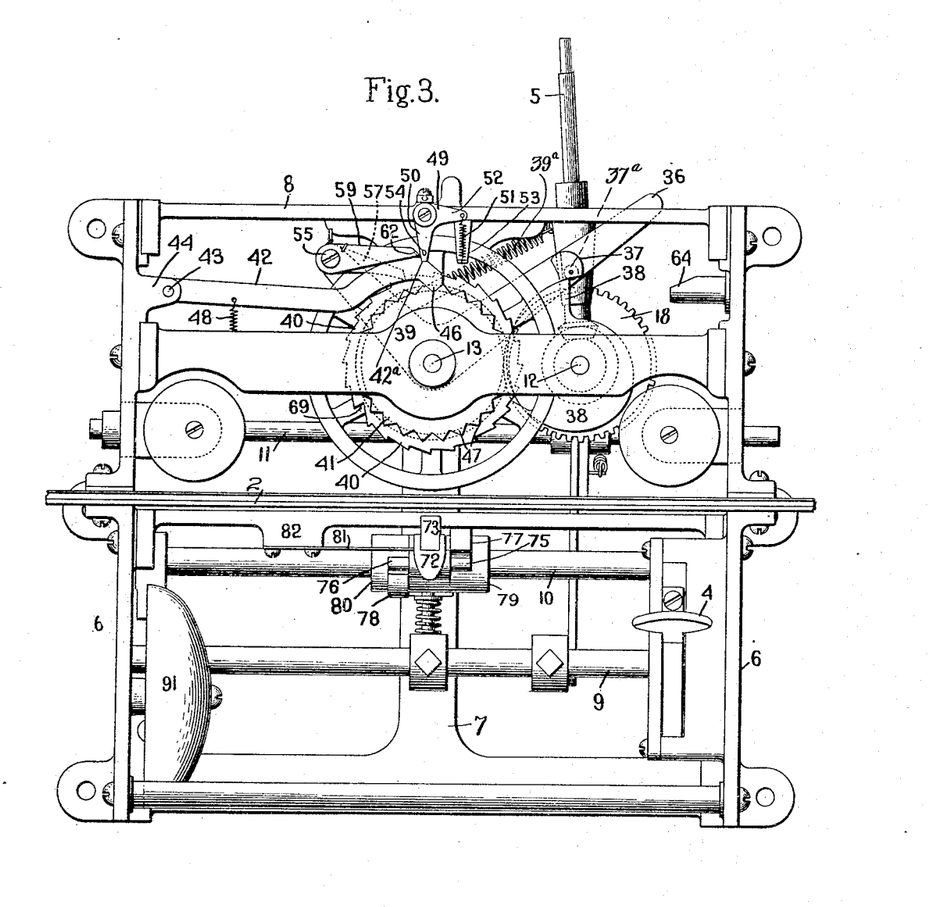
Fig. 3 is a front view of the recording apparatus, the casing having been removed.

The hour and day printing wheels are actuated through the medium of a bell crank (Figs. 3 and 6) mounted upon a bushing 8ª supported by a depending projection 8ᵇ of the top plate 8 and concentric with the main shaft 13. One arm 36 of said bell crank is provided with a lug 37 (Fig. 3) which engages a cam 38 carried by the driving shaft 12, the bell crank thereby receiving its idle or backward movement. To reduce the friction load upon the clock, an anti-friction roll 37ª is mounted within a slot in the lug 37, its periphery projecting slightly below the lower surface of the lug. During the greater portion of the travel of the cam 38 the arm 36 rests upon the roll 37ª and a very light drag upon the clock results. Just previous to the hour change the point of the cam passes beyond the roll and the arm 36 is then supported upon the lug 37, which insures accurate timing of the hour change. As will be hereinafter explained in detail, the other arm 39 of the bell crank carries pawls adapted to engage ratchet wheels fixed to the hour and day wheels respectively. It also carries releasing arms which are adapted to engage tumblers which normally lock the hour and day wheels from rotation and release the same just before the pawls engage the ratchets to advance the hour and day wheels respectively. The mechanisms are so arranged that immediately after the day or hour wheels have been advanced one step the parts are again automatically locked and any overthrow prevented. A coil spring 39ª is secured at one end to the frame member 8 (Fig. 3) and at the other end to the arm 39 and constitutes the actuating means for the pawls during their operative or forward movement.

In view of the fact that the mechanisms for operating the day and the hour wheels are very similar, a description of one will, in the main, serve for both.

The mechanism for rotating and positioning the hour wheel will first be described.

The hour wheel 15, as before stated, is rotatably mounted upon the main shaft 13. A ratchet wheel 40 (Fig. 3) having 24 teeth, and a positioning disk 41 having V-shaped teeth corresponding in number and position to the hour characters are rigidly secured to the hour wheel. A positioning detent 42 is pivoted upon a shaft 43 carried by lugs 44, 45 (Figs. 3 and 5) on the frame and has a V-shaped end 46 which is pressed into engagement with the teeth 47 of the positioning disk by a spring 48. By reason of the fact that the V-shaped end 46 conforms exactly to the recesses between the teeth 47 of the positioning disk the hour printing wheel is always held in proper position for printing an hour.

The pivoted detent 42 is normally locked by an L-shaped tumbler 49 (Fig. 3) pivoted upon the top frame 8. One arm 50 of the tumbler is held in engagement with a notch 42ª in the top of the detent 42 by a spring 51 attached to the other arm 52 of the tumbler and to a bracket 53 which projects downwardly from the top plate 8.

A similar detent and tumbler are provided for locking the day wheel, as will be hereinafter described. The arm 39 of the bell crank carries at its end a stud 55 upon which is loosely mounted a sleeve 56 (Figs. 5 and 6) carrying pawls 57 and 58 for rotating the day and hour wheels respectively. The pawls 57 and 58 are both rigidly secured to the sleeve 56, and a releasing arm 60, for forcing the day wheel tumbler from locking position, is firmly secured to the pawl 58, so that the pawls 57 and 58 and the arm 60 move in unison about the stud 55. A releasing arm 59 for forcing the hour wheel tumbler from locking position, is loosely mounted on the stud 55. The pawl 57 for rotating the hour wheel is pressed into engagement at all times with the teeth of the ratchet wheel 40 by a spiral spring 61 coiled about and secured to the stud 55, the free end of said spring being hooked over the top of the pawl 58. The releasing arm 59 has an offset end 62 adapted to coöperate with a pin 54 on the arm 50 of the tumbler 49 and is mounted at the forward end of the stud 55. It is normally depressed by a spiral spring 63 which is coiled around and secured to the stud 55, the free end of said spring being hooked over the top of the releasing arm 59.

The rotation of the hour wheel is accomplished as follows: The main shaft is driven at the same speed as the drive shaft through the medium of gears 17, 18, and each makes one full revolution each hour. The cam 38 is so mounted upon the driving shaft that the lug 37 on the arm 36 of the bell crank lever will drop over the shoulder of said cam at the instant the 00 character of the minute wheel reaches printing position. When the arm 36 of the bell crank lever drops, the other arm 39 also rotates about the main shaft under the influence of the spring 39ª. This movement first causes the offset end 62 of the releasing arm 59 to strike the pin 54 on the tumbler arm 50 and force the end of said tumbler arm from its locking engagement in the notch 42ª of the detent 42, thus releasing the detent. Upon further forward movement of the bell crank arm 39 the pawl 57 engages the shoulder of a ratchet tooth and advances the same one step, the extent of movement of said pawl being limited by a lug 64 (Fig. 3) on the end frame 6 against which the extended end of the bell crank arm 36 strikes. After the pawl has advanced far enough to rotate the hour wheel slightly over one half a step the offset 62 of the releasing arm 59 passes under the pin 54 on the tumbler arm 50 and permits the latter to be instantly thrown back by the spring 51 toward locking position.

In the forward movement of the ratchet wheel the end of the detent arm 42 rides up the forward side of a tooth 47 of the positioning disk 41 and as soon as it passes the crest of the tooth it aids in advancing the hour wheel until the end of said arm reaches full engagement with the positioning disk. In the meantime the tumbler 49 has been released so that the instant the end of the detent 42 reaches normal position it is again locked by the tumbler arm 50.

*Day printing wheel mechanism.*—The mechanism for actuating the day wheel is substantially the same as that above described for operating the hour wheel, there being a ratchet wheel 65 and a positioning disk 66 (Figs. 5 and 6) attached rigidly to said day wheel 16, and coöperating respectively with the pawl 58 carried by the sleeve 56, a locking detent 67, a tumbler 68 and a releasing arm 60. The means for actuating the day wheel differs from that of the hour wheel, however, in that the ratchet wheel 65 is smaller than the ratchet wheel 40 and the pawl 58 and the releasing arm 60 for unlocking the tumbler 68 are each so secured to the sleeve 56 as to be normally held out of operative relation with the ratchet wheel 65 and tumbler 68 respectively, by the pawl 57 resting upon the large ratchet wheel 40.

The hour ratchet wheel 40 is provided with one deep notch 69 (see Fig. 3) so positioned as to be engaged by the pawl 57, which rotates the hour wheel, at midnight. When the pawl 57 drops into this deep notch it allows the pawl 58 and releasing arm 60, which are attached thereto, to drop sufficiently to coöperate with the ratchet and tumbler for the day wheel and advance the latter one step in the same manner as above described in connection with the hour wheel.

Figure 8:
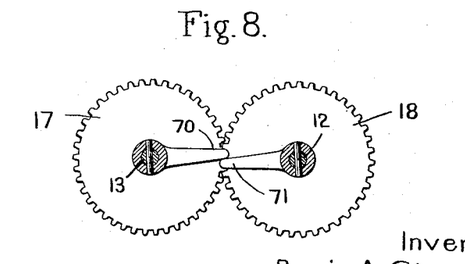
Fig. 8 is a detailed view of the safety fingers.

While the mechanism above described will usually position the type wheels correctly, there is a possibility of wrong registration at the end of each hour, as for instance, when the positions of the type wheels change from 1:59 to 2:00. If the workman should insert his card slightly before the hour change takes place and depress the operating lever quickly, the auxiliary finger 30 might move the minute type wheel 14 forward slightly in advance of the normal position of the gears 17 and 18, and the printing mechanism would thus be caused to register 1:00 instead of 2:00. To obviate this difficulty safety fingers 70, 71 (Fig. 8) are secured to the main shaft 13 and driving shaft 12 respectively in such position as to come in contact when the hour change takes place, and should a registration occur at the instant when the auxiliary finger 30 enters a space in the positioning wheel which would locate the type wheel in a position to register 00 before the hour type wheel is advanced, the engagement of the safety fingers will cause the driving shaft 12 to be rotated forward slightly and thus permit the lug 37 of the lever 36 to drop over the shoulder of the cam, permitting the operating pawl to advance and position the hour wheel for the proper registration of the hour, as before described. By the operation of the safety fingers in connection with the yielding gear upon the main shaft and the positioning mechanism for the minute wheel, the correct recording of the hour and minute is positively assured.

The printing mechanism for the apparatus heretofore described comprises, in addition to the type wheels, a hammer 72, provided with a yielding surface 73, supported at the end of an arm 74, which is pivoted upon the rock shaft 10. Lugs 75, 76, (Figs. 3 and 6) projecting from the side of the hammer arm engage oppositely disposed projections 77, 78 upon collars 79, 80, which are secured to the rock shaft 10 by set screws in such a position as to permit a slight free vibration of the printing arm 74. This slight vibration permits the hammer, when operated, to strike a quick blow upon the bottom of the card and to force the same against the type on the type wheel. A leaf spring 81 (Fig. 3) is secured to a lug 82 upon a cross bar of the frame above the hammer arm, and serves to quickly return the hammer after the printing stroke and to hold it normally out of contact with the type wheels. The rock shaft 10 which carries the type hammer is actuated through a bell crank mechanism, (Fig. 4) one arm 83 of said bell crank being attached through the medium of a spring 84 to the rear frame 7 of the machine. The other or forward end 85 of the bell crank is engaged by a pawl 86 pivoted at 86ª to the hand lever 4 and normally pressed into engagement with said bell crank arm by a spring 87. The pawl 86 has near its end a lug 88 which rides upon a fixed cam surface 89 on the end frame of the machine so that when the hand lever is depressed, the pawl rotates the rock shaft 10 against the tension of the spring 84, depressing the hammer arm for its stroke. Upon a complete depression of the hand lever 4 the pawl 86 is caused by the cam 89 to be released from its engagement with the arm 85 of the bell crank. The spring thereupon causes the printing hammer to strike a quick blow against the bottom of the time card. Upon the release of the hand lever the pawl again engages the end of the bell crank lever, and is ready for the next operation.

The rock shaft 10 also carries a hammer 90 which is adapted to strike a bell 91 simultaneously with the stroke of the printing hammer, thus notifying the workman that a record has been made upon his card.

The mechanism for operating the ribbon comprises a shaft 11 extending lengthwise of the machine and carrying gears 92, 93 (Fig. 5) near its end, which are adapted to engage alternatively with gears 94, 95 upon the ends of counter shafts 96, 97, upon which are mounted reels 98, 99 carrying the inked ribbon. The shaft 11 is rotated through the medium of a ratchet wheel 100 (Fig. 4) mounted on said shaft and actuated and controlled by pawls 101, 102 mounted upon a link 103 attached to an arm on the main rock shaft 9. Mechanism is provided for reversing the direction of feed of the ink ribbon, which is substantially identical with that shown and described in Patent 1,045,339, granted to D. A. Stowell, Nov. 26, 1912, and need not be further described.

Having fully described our invention, what we claim is new and desire to secure by Letters-Patent is:—

1. In a time recorder, in combination, manually operated impression mechanism, a time printing wheel, automatic means for advancing the same, separate manually-controlled means effective during the printing operation only to position and lock the printing wheel, and auxiliary manually-controlled means effective to preliminarily move the printing wheel into position to be acted upon by the first named positioning means, said positioning means and said auxiliary means being rendered operative only by movement of said impression mechanism.

2. In a time recorder, in combination, a time printing wheel, means for continuously rotating the same, and separate means for positioning and locking the printing wheel during the printing operation only, said means comprising a positioning wheel, means adapted to engage the positioning wheel and preliminarily adjust the same, and additional locking mechanism coöperating with the positioning wheel and adapted to finally position the printing wheel and to secure the same from movement during the printing operation.

3. In a time recorder, in combination, a time printing wheel, a shaft to which the wheel is secured, automatic means for actuating the shaft, and manually operated means for positioning and locking the printing wheel while printing, comprising a toothed positioning wheel rigidly mounted on said shaft, means adapted to engage a tooth of the positioning wheel to preliminarily adjust the same, and locking mechanism coöperating with the teeth of the positioning wheel to finally position the printing wheel and to secure the same from movement during the printing operation only.

4. In a time recorder, in combination, a time printing wheel, a shaft to which the wheel is secured, means for actuating the shaft, and means for positioning and locking the printing wheel while printing, comprising a toothed positioning wheel rigidly mounted on the shaft which carries said printing wheel, a locking bolt adapted to engage the teeth of the positioning wheel, a pawl controlled by the locking bolt adapted to engage a tooth of the positioning wheel and adjust the latter for proper engagement with the locking bolt and means for operating said locking bolt.

5. In a time recorder, in combination, a time printing wheel, a shaft to which the printing wheel is secured, means for actuating the shaft and means for positioning and locking the printing wheel while printing, comprising a positioning wheel fixed to said shaft and having acute angled V-shaped teeth and corresponding recesses between the same, a locking bolt the end of which is complementary to the recesses in the positioning wheel, a pawl controlled by the locking bolt adapted to engage a tooth of the positioning wheel and preliminarily position the same, and means for operating the locking bolt.

6. In a time recorder, in combination, manually operated impression mechanism, a time printing wheel, means for continuously rotating said wheel, a toothed positioning wheel rigidly connected thereto, a locking bolt having a beveled end adapted to enter the space between any two adjacent teeth on the positioning wheel, an auxiliary positioning finger constructed to engage the wheel in advance of the locking bolt and to preliminarily adjust the wheel so that no tooth thereon shall be in alinement with the beveled end of the locking bolt, and means associated with said impression mechanism for actuating said bolt and finger.

7. In a time recorder, in combination, a time printing wheel, a shaft to which the printing wheel is secured, means for actuating the shaft and means for positioning and locking the printing wheel while printing, comprising a toothed positioning wheel rigidly mounted on the shaft which carries said printing wheel, a locking bolt, a pawl controlled by the same adapted to engage a tooth of the positioning wheel and preliminarily adjust the latter for proper engagement with the locking bolt and means adapted to engage the positioning wheel at a predetermined time and prevent backward movement thereof.

8. In a time recorder, in combination, a time printing wheel, means for continuously rotating the same, a printing hammer and means for positioning and locking the printing wheel during the printing operation only, said means comprising a positioning wheel having acute angled V-shaped teeth and corresponding recesses between the same, a locking bolt, the end of which is complementary to the recesses in the positioning wheel, a spring actuated pawl adapted to engage a tooth of the positioning wheel and preliminarily position said wheel, and means for manually operating the locking bolt and controlling the operation of the pawl in conjunction with the actuation of the printing hammer.

9. In a time recorder, in combination, manually operated impression mechanism, printing mechanism comprising minute and hour printing wheels, a driving shaft actuated by clock mechanism and controlling the intermittent feed of the hour wheel, a main shaft carrying the minute wheel, devices controlled by said impression mechanism for positioning the minute wheel preliminarily to the making of an impression thereon, connections through which the driving shaft normally drives the main shaft, and additional connections through which the main shaft will positively advance the driving shaft when said main shaft is advanced by said positioning devices to bring the zero of the minute wheel to printing position before the corresponding advance of the hour wheel occurs.

10. In a time recorder, in combination, a printing mechanism comprising minute and hour printing wheels, a driving shaft actuated by clock mechanism, a main shaft to which the minute wheel is rigidly connected and upon which the day and hour wheels are rotatably mounted, connections between the driving shaft and the main shaft, through which the main shaft is normally rotated, means for positioning the minute wheel, and safety fingers rigidly secured to the driving shaft and main shaft respectively, and through which the main shaft may positively move the driving shaft to positively coördinate the positions of the printing wheels.

11. In a time recorder, in combination, time printing mechanism, a card supporting shelf having a longitudinal groove in its lower surface, a rod longitudinally movable in said groove, a card positioning abutment secured to said rod, a second abutment definitely spaced from said first named abutment by the coöperation of a slot in the rod and a latch in said second abutment, and a spring pressing said latch into said slot and said rod into said groove to hold the abutments in adjusted position relative to said printing mechanism, said latch being provided with means whereby the abutments may be released for longitudinal movement.

In testimony whereof I have hereunto set my hand, in the presence of two subscribing witnesses.

DESRIE A. STOWELL.

Witnesses:
  THATCHER B. DUNN,
  ALTHA M. STOWELL.

In testimony whereof I have hereunto set my hand, in the presence of two subscribing witnesses.

ALBERT C. SMITH.

Witnesses:
  WILLIAM E. BAGG,
  WILLIAM R. GARDINER.

In testimony whereof I have hereunto set my hand, in the presence of two subscribing witnesses.

EDWIN H. COSGROVE.

Witnesses:
  P. JACOBSON,
  W. J. FIMISTER.

Copies of this patent may be obtained for five cents each, by addressing the "Commissioner of Patents. Washington, D. C."